(12) United States Patent
Winsness

(10) Patent No.: US 8,489,233 B2
(45) Date of Patent: *Jul. 16, 2013

(54) METHOD OF BLENDING FUELS AND RELATED SYSTEM

(75) Inventor: David J. Winsness, Alpharetta, GA (US)

(73) Assignee: GS Cleantech Corporation, New York, NY (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/157,807

(22) Filed: Jun. 10, 2011

(65) Prior Publication Data

US 2011/0233233 A1   Sep. 29, 2011

Related U.S. Application Data

(63) Continuation of application No. 12/162,708, filed as application No. PCT/US2007/002446 on Jan. 29, 2007.

(60) Provisional application No. 60/763,291, filed on Jan. 30, 2006.

(51) Int. Cl.
  *G06F 17/00*   (2006.01)
  *B67D 7/06*   (2010.01)
  *E03B 1/00*   (2006.01)
  *G01F 11/00*   (2006.01)

(52) U.S. Cl.
  USPC ............. 700/239; 222/1; 222/144.5; 137/3

(58) Field of Classification Search
  USPC .................. 700/239, 231–233, 240, 241
  See application file for complete search history.

(56) References Cited

U.S. PATENT DOCUMENTS

| 3,762,428 | A | * | 10/1973 | Beck et al. ............... 137/88 |
| 3,901,197 | A | * | 8/1975 | Noguchi et al. .......... 123/3 |
| 4,601,303 | A | * | 7/1986 | Jensen ...................... 137/3 |
| 4,677,567 | A | * | 6/1987 | Grosser et al. .......... 700/268 |
| 4,876,653 | A | | 10/1989 | McSpadden et al. |
| 5,029,100 | A | | 7/1991 | Young et al. |
| 5,038,971 | A | | 8/1991 | Gayer et al. |
| 5,163,586 | A | | 11/1992 | Zinsmeyer |
| 5,362,965 | A | | 11/1994 | Maggard |
| 5,578,090 | A | | 11/1996 | Bradin |

(Continued)

FOREIGN PATENT DOCUMENTS

EP       0733796 A2   9/1996
WO   2007089728 A2   8/2007

OTHER PUBLICATIONS

Office Action—Final for U.S. Appl. No. 12/162,708, filed Jul. 30, 2008; First Named Inventor: David Winsness; Mail Date: May 26, 2011.

(Continued)

*Primary Examiner* — Michael K Collins
(74) *Attorney, Agent, or Firm* — Cantor Colburn LLP

(57) ABSTRACT

A method and related system blend fuels and dispense a blended fuel to a vehicle at a fueling station. In one aspect, the method comprises selecting the desired proportion of at least one of the fuels available at the service station, blending that fuel with another one available, and delivering the blended fuel to the vehicle. Preferably, the first fuel is a non-renewable, petroleum based one, while the second fuel is a non-petroleum based, renewable one (such as ethanol or biodiesel).

10 Claims, 4 Drawing Sheets

U.S. PATENT DOCUMENTS

| | | | |
|---|---|---|---|
| 6,006,775 A | 12/1999 | Negley, III | |
| 6,112,134 A | 8/2000 | Terranova et al. | |
| 6,422,465 B2 | 7/2002 | Miller | |
| 7,497,191 B2* | 3/2009 | Fulton et al. | 123/3 |
| 8,352,071 B2* | 1/2013 | Winsness | 700/239 |
| 2001/0034567 A1* | 10/2001 | Allen et al. | 700/283 |
| 2004/0031388 A1* | 2/2004 | Hsu | 95/143 |
| 2005/0055874 A1* | 3/2005 | Bekemeyer | 44/629 |
| 2005/0132640 A1* | 6/2005 | Kelly et al. | 44/301 |
| 2009/0005903 A1* | 1/2009 | Winsness | 700/239 |

OTHER PUBLICATIONS

International Search Report mailed Dec. 13, 2007, for International Application No. PCT/US07/02446; 11 pages.

Office Action—Non-Final for U.S. Appl. No. 12/162,708, filed Jul. 30, 2008; First Named Inventor: David Winsness; Mailing Date: Dec. 15, 2010.

* cited by examiner

METHOD OF BLENDING FUELS AND RELATED SYSTEM

This application claims the benefit of legally related Non-Provisional application Ser. No. 12/162,708; filed on Jul. 30, 2008; published as U.S. Publication No. 20090005903 A1 on Jan. 1, 2009; which claims the benefit of a legally related 371 of PCT/US07/02446; filed on Jan. 29, 2007; published as O2007/089728A2 on Aug. 9, 2007; which claims the benefit of legally related U.S. Provisional Patent Application Ser. No. 60/763,291, filed Jan. 30, 2006, the contents of which are incorporated by reference herein in their entirety.

COPYRIGHT STATEMENT

A portion of the disclosure of this document contains material subject to copyright protection. No objection is made to the facsimile reproduction of tile patent document or this disclosure as it appears in the Patent and Trademark Office files or records, but any and all rights in the copyright(s) are otherwise reserved.

TECHNICAL FIELD

The present invention relates generally to a method of blending fuels and, more particularly, to blending renewable fuels, such as biodiesel and ethanol, with petroleum-based fuels, such as gasoline and diesel, at a fueling station for vehicles.

BACKGROUND OF THE INVENTION

Over the past thirty years, significant attention has been given to the production of ethyl alcohol, or "ethanol," for use as an alternative fuel. Ethanol not only burns cleaner than fossil fuels, but also can be produced using corn, a renewable resource. At present, an estimated sixty-nine "dry milling" plants in the United States produce over three billion gallons of ethanol per year. Additional plants presently under construction will add hundreds of millions of gallons in an effort to meet the ever-increasing demand.

Besides ethanol, a great deal of attention is presently being given to a newer class of alternative fuels, loosely termed "biodiesel." Like ethanol, biodiesel is also a clean burning fuel produced from renewable resources, such as animal fats, soybean oil, corn oil, and waste grease from cooking. Although biodiesel contains no petroleum, it can be blended at any level (proportion) with petroleum-based diesel to create a blended fuel. Such blended fuel can be used in existing diesel engines with little or no modifications.

At the present time, feedstocks (i.e., corn, fats, greases, etc.) are collected and transported to regional facilities for conversion to ethanol or biodiesel. From there, the end products are transported to large terminals for mass blending with diesel fuel or gasoline. The resulting mixture is then transported to fueling stations, such as via tanker truck or rail car. There, it is of course manually pumped into the self-contained fuel tanks of vehicles through a nozzle associated with an individual fueling terminal or "gas pump."

Despite the prevalence of the foregoing model for the past several decades, it is relatively inefficient and inflexible. Although any concentration of ethanol can be used as a gasoline additive, higher concentrations require an adjustment to the engine controls, such as timing. However, the consumer presently has no choice but to use the ethanol-gasoline blend as formulated for delivery to the fueling station.

Additionally, in October 2004, President Bush signed into law a blenders tax credit to stimulate biodiesel production. This law provides that for each gallon of biodiesel blended with petroleum diesel, the blender shall receive a one dollar tax credit for a specific type of oil or fat converted and 50 cents per gallon on others. While the law stimulates interest from the owner of the fuel terminal to use biodiesel due to profit incentives, it does not in any way encourage the interest of the fuel station owner or the individual consumer. If the biodiesel were instead blended at the pump, then the fueling station would receive the tax credit directly and have the ability to pass a portion onto the consumer.

Moreover, the ability to selectively increase the amount of biodiesel used at the service station would encourage consumers to use a greater concentration than might otherwise be selected by the field. Assuming diesel and biodiesel are sold for \$2.50 per gallon (including federal and state taxes for each), the influence of the tax credit on particular concentrations is shown in the following table:

$B80=20\%*\$2.5+80\%*(\$2.5-\$1)=\$1.70$ per gallon $B60=40\%*\$2.5+60\%*(\$2.5-\$1)=\$1.90$ per gallon $B20=20\%*\$2.5+20\%*(\$2.5-\$1)=\$2.30$ per gallon $B5=95\%*\$2.5+5\%*(\$2.5-\$1)=\$2.45$ per gallon.

$B2=98\%*\$2.5+2\%*(\$2.5-\$1)=\$2.48$ per gallon

Consequently, the owner of the fueling station would be encouraged to pass a portion of the savings to the end user in order to sell more biodiesel and obtain a higher tax credit.

U.S. Pat. No. 6,422,465 to Miller, the disclosure of which is incorporated herein by reference, discloses a process for custom mixing fuel at the point of purchase. However, the proposal is to use a bar code associated with the vehicle or its fuel tank to determine the blend to be created. A significant disadvantage thus results, since the user is unable to select the proportion of the renewable fuel, and must instead rely on the information contained in the bar code. There is thus no incentive to increase the amount of renewable fuel used in the blend.

Accordingly, a need is identified for a method for blending renewable fuels with petroleum based fuels in a more efficient and effective manner, and preferably at the "point of sale" based on a user-selected proportion of the renewable fuel. The method would encourage the use of such fuels by station owners as well as consumers, and would allow for the particular blend to be selected "at the pump" or otherwise onsite to avoid the need for pre-delivery blending at an offsite location, such as at a regional facility, or otherwise at a fixed concentration ratio. Eliminating this step in the conventional process would significantly reduce costs, which would be passed onto the end consumer. The method would be simple in operation, and could be accomplished using existing technology, thus potentially allowing for the implementation of a relatively low-cost retrofit solution.

SUMMARY OF THE INVENTION

In accordance with one aspect of the invention, a method of dispensing a blended fuel to a vehicle at a fueling station is disclosed. The method comprises, at the fueling station, selecting a proportion of a first fuel comprising the blended fuel. The method further comprises blending the first fuel in the selected proportion with a second fuel, and delivering the blended fuel to the vehicle.

Preferably, the first fuel is selected from the group consisting of biodiesel, ethanol, and mixtures thereof and the second fuel comprises either diesel or gasoline. The method may further comprise the step of pumping at least the first fuel from a storage vessel through flow control valves for blending. Preferably, the selecting step comprises controlling a valve to adjust the flow of the first fuel from the storage vessel.

In some situations, the method may involve substantially matching the temperature of the first and second fuels before the blending step. This step may be combined with monitoring the temperature of at least one of the first and second fuels during delivery. The method may further include the step of metering the flow of the first and second fuels, either by way of a flow meter or a metering pump.

In addition, the method may involve the use of a third fuel blended on site with another fuel to create a second blended fuel. Preferably, the third fuel is biodiesel in the case where the second fuel is ethanol. In any case, the selecting step may be performed by the owner of the fueling station, or alternatively the consumer.

Another aspect of the invention involves a method of encouraging resource conservation at a fueling station for dispensing a blended fuel to a vehicle. The method comprises blending a renewable and a non-renewable fuel at the fueling station to produce the blended fuel. The method further comprises obtaining a tax credit from the amount of the renewable fuel in the blended fuel.

Preferably, the method also comprises selecting the amount of at least one of the renewable and non-renewable fuel comprising the blended fuel. Still more preferably, the step of pricing the blended fuel according to the tax credit obtained is also performed. To encourage use of the renewable fuel, the method may further involve displaying the amount of savings realized by the consumer by selecting a particular blended fuel.

Yet another aspect of the invention is a system for dispensing blended fuel at a fueling station having a first storage vessel having a first fuel at the fueling station and a second storage vessel having a second fuel at the fueling station. The system comprises a fuel terminal with a nozzle adjacent the storage vessels. A selector is provided for selecting a proportion of at least one of the first or second fuels to be blended with the other to create a blended fuel for delivery through the nozzle. A blender blends the first fuel with the second fuel at the selected proportion to form a blended fuel delivered through the nozzle.

Preferably, the blender includes a flow control valve associated with each storage tank and a common line for receiving the flow of each fuel from the corresponding storage vessel. More preferably, the blender comprises at least one metering pump. A common delivery line may be associated with the nozzle and the blender, and may further include a mixer.

The system may further include a third storage vessel having a third fuel and a fourth storage vessel having a fourth fuel. In that case, a second selector is provided for selecting a proportion of the third fuel to the fourth fuel to be blended. Blending may be by way of a second blender for delivery through the nozzle.

DETAILED DESCRIPTION OF THE INVENTION

Figure 1:
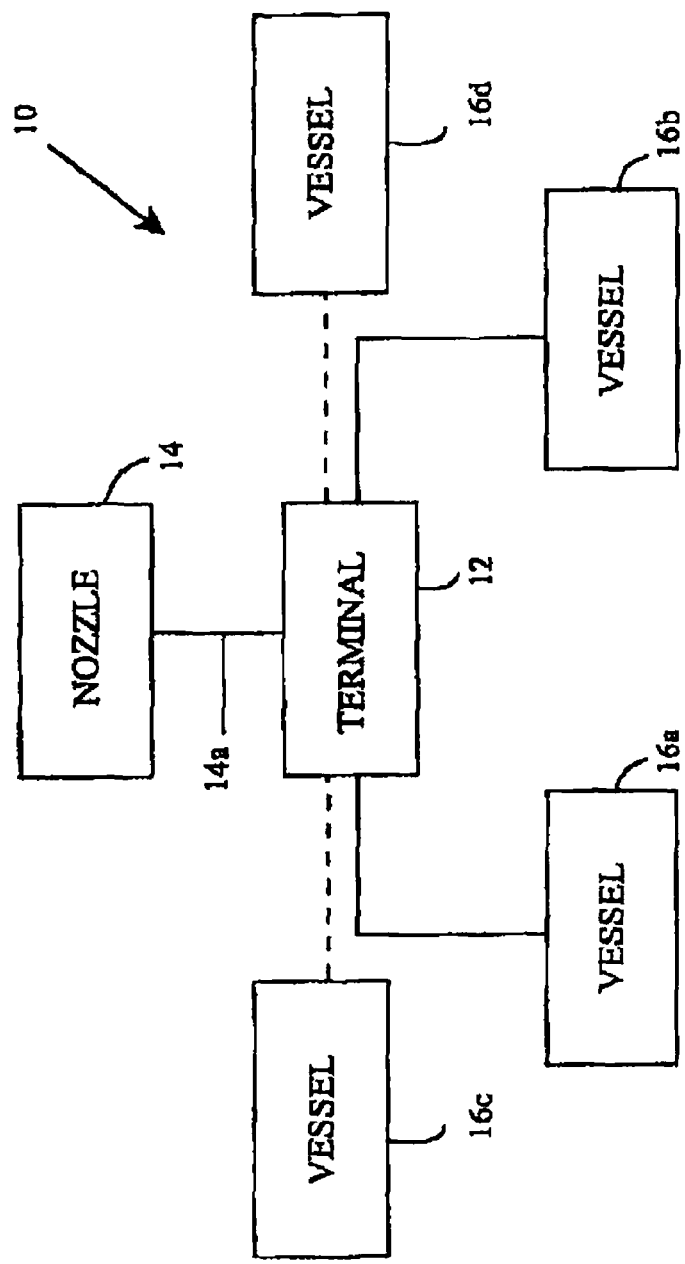
FIG. 1 is a block diagram illustrating one possible embodiment for practicing the disclosed invention.
Figure 2:
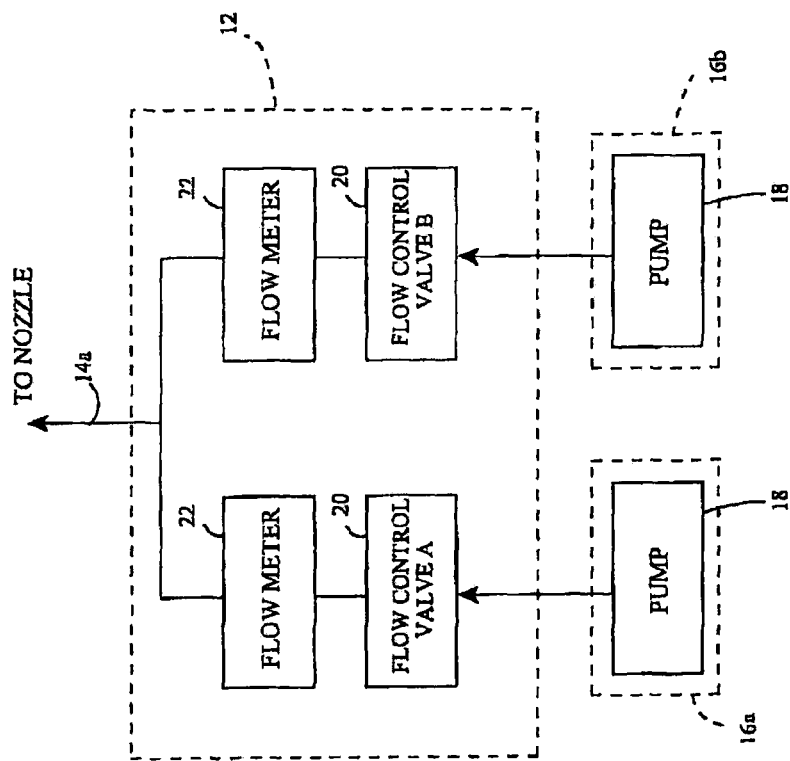
FIG. 2 is a block diagram showing another aspect of the invention.
Figure 3:
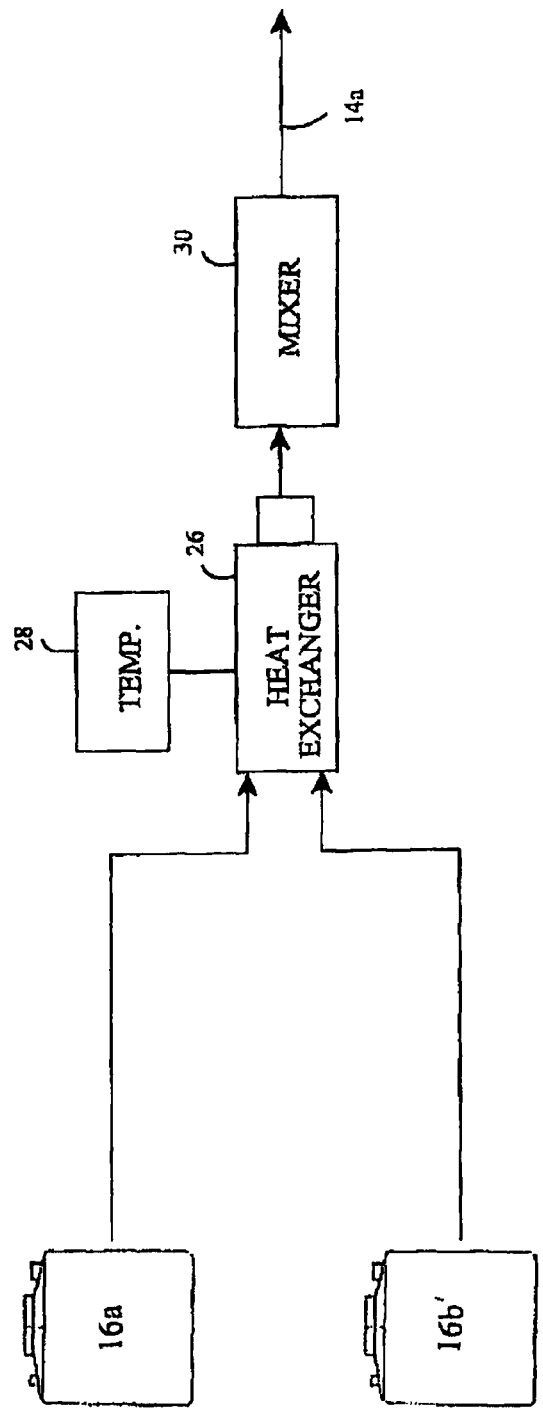
FIG. 3 is a partially block, partially schematic diagram illustrating yet another aspect of the invention.

Reference is now made to FIGS. 1-3, which together illustrate and describe various aspects of the present invention in more detail. In its broadest terms, the present invention relates to a method of blending at least one renewable fuel with a non-renewable fuel "at the pump" (i.e., at the point of sale) and a related fueling station pump (hereinafter called a "terminal" to avoid confusion with onboard vehicle fuel pumps and the pumps that may be used to deliver the fuel from a storage vessel) that meters out the desired proportion of fuels in blended form. The method thus allows for the end consumer to select and control the blend of two fuels, such as one that is renewable and one that is not, in order to conserve energy and perhaps even obtain a reward in the form of a reduction in fuel cost.

In the most preferred embodiment, the blending is of biodiesel with diesel, or ethanol with gasoline. However, the method is not necessarily limited to these fuels and may apply without limitation to mixing any type of renewable fuel with a non-renewable one "at the pump" or otherwise at the service station (as contrasted with a location remote from the service station, such as at a refinery or an intermediate processing plant).

In its simplest form, the inventive method is implemented by modifying an existing fuel dispensing terminal at a fueling station to be specially adapted for pumping a fuel blended onsite, such as petroleum-based diesel and biodiesel. As a result, the fuel pumping operation works similar to that presently done with regular diesel or gasoline, such as with the vehicle arriving at the fueling station, followed by the selection of the method of payment and taking steps necessary to pump the fuel (e.g., by lifting an associated handle, pressing a button, or otherwise communicating a signal to commence the pumping). However, in addition to these conventional steps, the inventive method requires the step of selecting the type of renewable and non-renewable fuels to be blended and the particular proportion or concentration desired. This may be accomplished using any type of suitable selector, such as a push button, touch screen, mechanical dial, or other form of switch that allows one to choose the proportion of the at least two fuels to be blended.

Figure 1A:
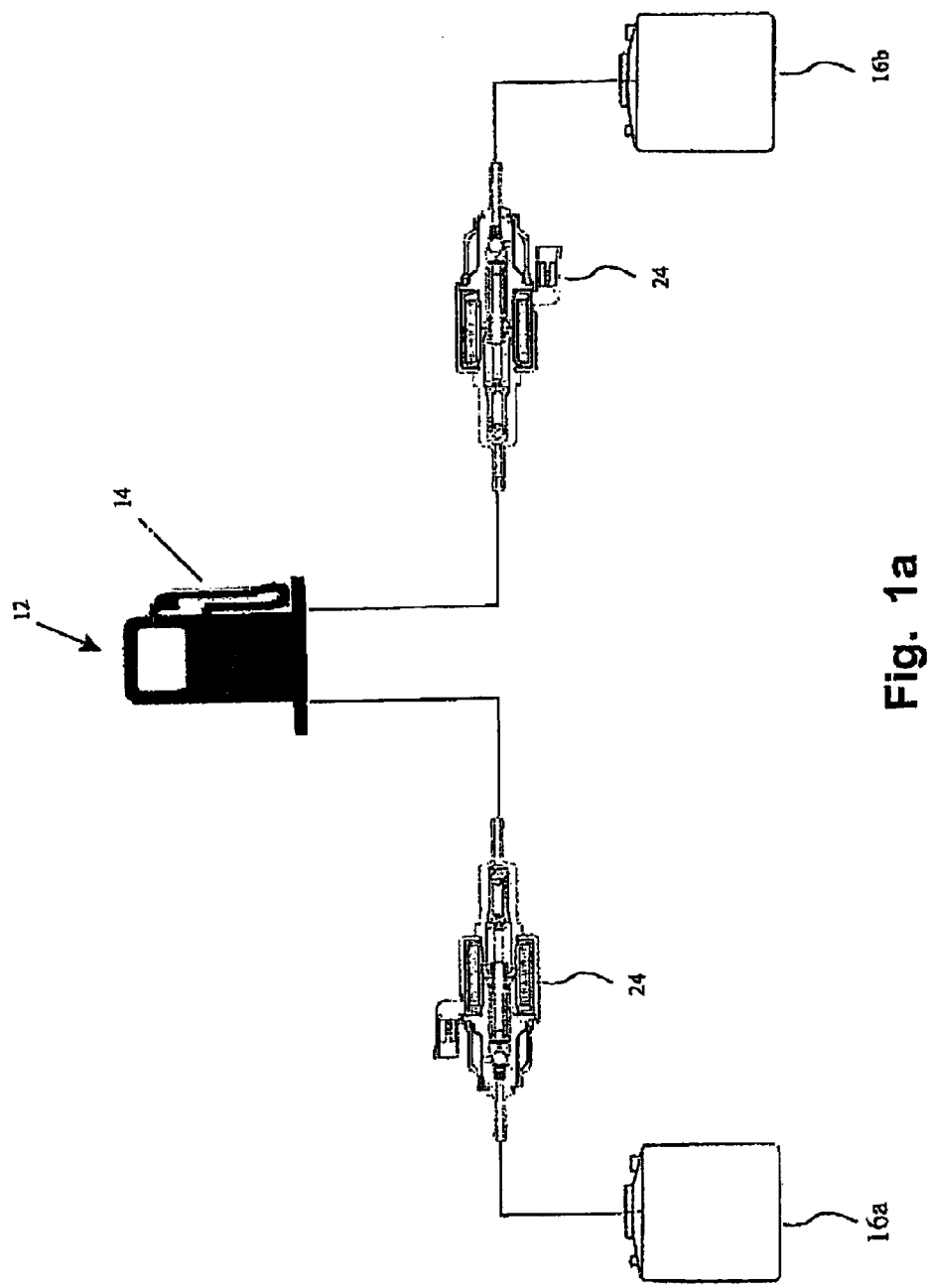
FIG. 1a is a schematic diagram illustrating another possible embodiment.

In one proposed embodiment, as shown in FIGS. 1 and 1a, the basic "blended" fuel dispensing system 10 may include a self-service terminal 12, as well as an elongated hose connected to a nozzle 14 for delivering the fuel (but could of course comprise multiple nozzles and corresponding hoses; see, e.g., U.S. Pat. No. 5,163,586 to Zinsmeyer, the disclosure of which is incorporated herein by reference). Besides these conventional structures, at least one additional fuel holding vessel is required, such as one for biodiesel (e.g., vessel 16b in FIG. 1, with vessel 16a holding petroleum-based diesel). Of course, in the case of gasoline, the other vessel may hold ethanol. Likewise, vessels 16c, 16d for both ethanol and biodiesel can be provided, along with the conventional separate vessels for diesel fuel and gasoline, all associated with the terminal 12 in a like manner. Regardless of the particular set-up used, each vessel 16a . . . 16n generally includes or is associated with a pump 18 to supply the pressure for pumping the corresponding fuel from the storage vessel or the like to the individual service station terminal 12 (see FIG. 2).

With this type of basic arrangement, a selected blend of fuel can be metered with a "blender." In one possible embodiment, this blender may be in the form of a simple valve operating between the vessels 16a, 16b and the nozzle 14. As illustrated schematically in FIG. 2, this valve may comprise a flow control valve 20 located, for example, at the individual terminal 12, and may be associated with one or more flow meters 22 for monitoring the output amounts (see FIG. 3). Alternatively, as shown in FIG. 1a, a metering pump 24 may be associated with each fuel storage vessel in order to precisely blend and control the flow of the fuels being combined, while obviating the need for flow meters. In either case, the opening and closing of the valves or the operation of the metering pump to achieve the selected blend may be electronically or mechanically controlled based on the selected input.

To ensure a reliable, consistent output from nozzle 14, it may be beneficial to mix the fuel products being blended at similar temperatures. As illustrated in FIG. 3, an effective method is to use a heat exchanger 26, such as a small plate and frame heat exchanger in which the two fuel products slated for blending are separated by the walls of the heat exchanger. This allows the temperatures to approach each other prior to being mixed. Additionally, the temperature of the fuel(s) can be monitored, as represented by block 28, and adjustments made, if necessary, to account for extreme weather conditions.

After the fuel products exit the metering lines (and any heat exchanger, if present), they may enter a common line 14a associated with the nozzle 14 for delivery to the tank of the associated vehicle. In this line, turbulent flow may be created using a mixer 30. The mixer 30 may comprise an inline mixer with stationary paddles around the inner tube walls (not shown). This helps to ensure that the fuel products blend in a suitable fashion before exiting the nozzle 14 and entering the vehicle tank. Of course, in the case where blended fuel is delivered to the common line 14a from different sets of storage vessels, it may be associated with a control valve (not shown) adjusted based upon the selected blend.

Another aspect of the invention comprises blending the fuel at the pump, and then obtaining any tax incentive (credit) available to reduce the overall cost of the blended fuel to the provider. The tax savings obtained can then be used by the provider to price the blended fuel accordingly. This directly passes the savings realized to the end consumer and thus promotes resource conservation by encouraging the consumer to use the blended fuel (and typically in the highest feasible amount to obtain the maximum savings). As an adjunct of this method, the fuel station owner could also dynamically display (either at the pump or on a detached sign) the amount of savings that would be realized by the consumer by selecting a particular blend (e.g., B80 $1.70 per gallon, B60=$1.90 per gallon, B20=$2.30 per gallon, B5=$2.45 per gallon, B2=$2.48 per gallon), thereby encouraging the use of a higher proportion of the renewable fuel.

The following is a prophetic example of one manner in which the present invention might be successfully practiced.

EXAMPLE

A consumer arrives at the fueling station in a vehicle in need of refueling. Upon pulling up adjacent to the fuel terminal, the consumer sees a display associated with the terminal showing that first and second fuel blends are available: each comprising biodiesel and diesel in inverse proportions (80/20; 20/80). The price for the 80/20 blend is $1.70 per gallon and the price for the 20/80 blend is $2.30 per gallon. The user manually selects the 80/20 blend.

The nozzle is placed in the appropriate location for filling the vehicle. An associated switch is triggered to commence flow through the nozzle. Metering pumps simultaneously deliver a 4:1 ratio of biodiesel to diesel by pumping a suitable volume of fluid per unit time from corresponding storage tanks to a common line in which the blended fuel is created. The consumer pays in the conventional manner depending on the amount of fuel metered. The station owner, having already passed the savings on to the consumer, then claims a tax credit for each gallon of biodiesel utilized.

The foregoing description provides illustration of the inventive concepts. The descriptions are not intended to be exhaustive or to limit the disclosed invention to the precise form disclosed. Modifications or variations are also possible in light of the above teachings. For example, although not the conventional process, the fuel could be manually dispensed from the storage vessels 16a, 16b at the fueling station, blended by mixing in a single vessel, and delivered to the vehicle. Also, while providing at least two storage vessels is disclosed, it should be appreciated that the method may further include additional storage vessels for other fuels capable of being blended and used in powering vehicles or the like. While the focus is also on blending biodiesel with diesel or ethanol with gasoline, the blending techniques and apparatus may apply to blending any renewable fuel with any petroleum base fuel, including diesel with ethanol. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. A method of encouraging resource conservation at a fueling station for dispensing a blended fuel to a vehicle, comprising:
    substantially matching a temperature of a renewable biodiesel fuel and a non-renewable diesel fuel prior to blending;
    blending the renewable biodiesel fuel and the non-renewable diesel fuel at the fueling station to produce the blended fuel; and
    obtaining an incentive based on the amount of the renewable biodiesel fuel in the blended fuel.

2. The method of claim 1, further comprising selecting the amount of at least one of the renewable and non-renewable fuel comprising the blended fuel.

3. The method of claim 1, further comprising the step of pricing the blended fuel according to the incentive obtained.

4. The method of claim 3, further comprising displaying the amount of savings realized by the consumer by selecting a particular blended fuel.

5. A system for dispensing blended biodiesel fuels at a fueling station having a first storage vessel having a first biodiesel fuel at the fueling station and a second storage vessel having a second petroleum-based diesel fuel at the fueling station, comprising:
    a fuel terminal with a nozzle adjacent the storage vessels;
    a selector for selecting a proportion of at least one of the first or second fuels to be blended with the other to create a blended biodiesel fuel for delivery through the nozzle;
    a heat exchanger for substantially matching a temperature of the first fuel to the second fuel prior to blending; and
    a blender for blending the first biodiesel fuel with the second petroleum-based diesel fuel at the selected proportion and at the substantially matched temperature to form a blended fuel having a desired B factor delivered through the nozzle.

6. The system of claim 5, wherein the blender includes a flow control valve associated with each storage tank and a common line for receiving the flow of each fuel from the corresponding storage vessel.

7. The system of claim 5, wherein the blender comprises at least one metering pump.

8. The system of claim 5, further including a common delivery line associated with the nozzle and the blender.

9. The system of claim 5, wherein the common delivery line includes a mixer.

10. The system of claim 5, further including a third storage vessel having a third fuel and a fourth storage vessel having a fourth fuel, and further including a second selector for selecting a proportion of the third fuel to the fourth fuel to be blended by a second blender for delivery through the nozzle.

* * * * *